(12) United States Patent
Vaughan

(10) Patent No.: US 12,297,129 B2
(45) Date of Patent: May 13, 2025

(54) WATER TREATMENT TANK WITH CONDUCTIVITY MONITOR

(71) Applicant: Clack Corporation, Windsor, WI (US)

(72) Inventor: Don Vaughan, Waunakee, WI (US)

(73) Assignee: Clack Corporation, Windsor, WI (US)

( * ) Notice: Subject to any disclaimer, the term of this patent is extended or adjusted under 35 U.S.C. 154(b) by 295 days.

(21) Appl. No.: 17/564,642

(22) Filed: Dec. 29, 2021

(65) Prior Publication Data

US 2023/0202881 A1      Jun. 29, 2023

(51) Int. Cl.
*C02F 1/42*      (2023.01)

(52) U.S. Cl.
CPC .......... *C02F 1/42* (2013.01); *C02F 2209/006* (2013.01); *C02F 2209/008* (2013.01);
(Continued)

(58) Field of Classification Search
CPC .... C02F 2209/05; C02F 2303/16; C02F 1/42; C02F 2001/422; C02F 2001/425; C02F 2001/427; C02F 2209/055; B01J 49/00; B01J 20/3441; B01J 49/05; B01J 49/06; B01J 49/07; B01J 49/08; B01J 49/09; B01J 49/10; B01J 49/12; B01J 49/14; B01J 49/16; B01J 49/18; B01J 49/80; B01J 49/85; B01J 20/34
See application file for complete search history.

(56) References Cited

U.S. PATENT DOCUMENTS 3,676,336 A    7/1972   O'Brien et al.
3,768,649 A   10/1973   Fleckenstein
(Continued)

FOREIGN PATENT DOCUMENTS

CN        105836854        8/2016
EP          1252855        5/2006
(Continued)

OTHER PUBLICATIONS

Zhao, W., Bhushan, A., Santamaria, A.D., Simon, M.G. and Davis, C.E., 2008. Machine learning: A crucial tool for sensor design. Algorithms, 1(2), pp. 130-152 (Year: 2008).*
(Continued)

*Primary Examiner* — Magali P Slawski
*Assistant Examiner* — Bernadette Karen McGann
(74) *Attorney, Agent, or Firm* — Boyle Fredrickson, S.C.

(57) ABSTRACT

A water treatment system has a water treatment tank that stores a resin bed, a conductivity monitor, a valve assembly, a flow meter, and a controller. The control valve assembly is switchable to selectively permit untreated water flow into the tank, treated water flow out of the tank, and regenerant flow into and out of the tank. In one configuration, the conductivity monitor includes at least an uppermost probe located within 6" of the nominal mid-point of the resin bed and a second probe located half-way between the first probe and the bottom of the resin bed. Signals from these probes are used in combination with flow data as measured by the flow meter to provide precise information regarding volumetric capacity as depletion is registered at each probe. Also disclosed are an improved technique for sampling data from the conductivity monitor, and a wireless conductivity monitor.

17 Claims, 11 Drawing Sheets

(52) U.S. Cl.
CPC ...... *C02F 2209/05* (2013.01); *C02F 2209/40* (2013.01); *C02F 2303/14* (2013.01)

(56) References Cited

U.S. PATENT DOCUMENTS

| | | | |
|---|---|---|---|
| 4,320,010 A | | 3/1982 | Tucci et al. |
| 4,320,020 A | | 3/1982 | Lange |
| 4,329,225 A | | 5/1982 | Davis et al. |
| 4,426,294 A | | 1/1984 | Seal |
| 4,496,906 A | | 1/1985 | Clack |
| 4,814,090 A | | 3/1989 | Kunz et al. |
| 4,847,598 A | | 7/1989 | Tucci et al. |
| 4,917,794 A | | 4/1990 | Fettes et al. |
| 5,022,994 A | | 6/1991 | Avery et al. |
| 5,234,601 A | | 8/1993 | Janke et al. |
| 5,544,072 A | | 8/1996 | Zimmerman et al. |
| 5,680,055 A | * | 10/1997 | Seitz ................ B01J 47/14 264/408 |
| 6,036,866 A | | 3/2000 | Zimmerman et al. |
| 6,417,679 B1 | | 7/2002 | Lenz |
| 6,696,966 B2 | | 2/2004 | Bearak |
| 6,790,362 B2 | | 9/2004 | FitzGerald et al. |
| 6,958,693 B2 | | 10/2005 | Rothgeb et al. |
| 7,329,338 B2 | | 2/2008 | Sieth et al. |
| 7,481,917 B2 | | 1/2009 | Ikeyama et al. |
| 7,488,424 B2 | | 2/2009 | Gruett et al. |
| 7,556,738 B2 | | 7/2009 | Premathilake et al. |
| 7,584,061 B2 | | 9/2009 | Wilf et al. |
| 7,966,097 B2 | | 6/2011 | Zimmerman |
| 8,608,963 B2 | | 12/2013 | Stewart et al. |
| 8,617,397 B2 | | 12/2013 | Ikeyama et al. |
| 8,671,985 B2 | | 3/2014 | Averbeck et al. |
| 8,696,912 B2 | | 4/2014 | Soecknick |
| 8,865,001 B2 | | 10/2014 | Gruett et al. |
| 9,758,387 B2 | | 9/2017 | Gruett et al. |
| 10,872,515 B2 | | 12/2020 | Jones et al. |
| 11,082,251 B2 | | 8/2021 | Khalid et al. |
| 2002/0149489 A1 | * | 10/2002 | Bearak .................. C02F 1/42 340/572.1 |
| 2003/0227394 A1 | * | 12/2003 | Rothgeb ............ A47L 15/4297 340/870.01 |
| 2009/0220380 A1 | | 9/2009 | Brown |
| 2009/0250397 A1 | | 10/2009 | Geisen et al. |
| 2011/0089113 A1 | * | 4/2011 | Stewart .................. C02F 1/42 210/97 |
| 2016/0052798 A1 | | 2/2016 | Downs et al. |
| 2017/0362093 A1 | | 12/2017 | Klingensmith et al. |

FOREIGN PATENT DOCUMENTS

| | | |
|---|---|---|
| EP | 2481713 | 3/2014 |
| EP | 3524577 | 3/2021 |
| WO | 2007103234 | 9/2007 |
| WO | 2015010143 | 1/2015 |

OTHER PUBLICATIONS

Reading, calibrating and normalizing the sensor values (https://theultimatelinefollower.blogspot.com/2015/12/reading-calibrating-and-normalizing.html) (published Dec. 13, 2015; retrieved Mar. 25, 2024) (Year: 2015).*

* cited by examiner

WATER TREATMENT TANK WITH CONDUCTIVITY MONITOR

BACKGROUND OF THE INVENTION

1. Field of the Invention

The present invention relates to a water treatment system and, more particularly, relates to a water treatment system having a tank that stores treatment media whose condition can be monitored by a conductivity monitor and to a conductivity monitor for such a tank. The invention additionally relates to a method of using such a conductivity monitor.

2. Discussion of the Related Art

Water treatment systems relying on resin exchange media are widely used. For example, "water softeners" are widely used for removing calcium and other deposit-causing materials from so-called "hard-water." The typical water softener relies on an ion exchanges process taking place in a resin tank or pressure vessel of the water softener. The exchange media is commonly referred to as resin because it is manufactured from styrene plastic polymerized with divinylbenzene to form beads. The resin in stored in the tank in a "bed." As the water to be processed passes through the resin bed, ions of calcium and other minerals in the water are exchanged with ions found in the resin, e.g., sodium, thereby removing objectionable ions from the water and exchanging them for preferred ions from the resin.

The capacity of the resin to exchange ions is finite and is reduced during the ion exchange process. As sodium is replaced with calcium, the resin is said to transform from a "sodium" state to a "calcium" state and loses its ion exchange capability. If measures are not taken to regenerate the resin by replacing the undesirable ions with desirable ions, the ion exchange capacity of the resin will become exhausted. Regeneration typically involves chemically replacing the objectionable ions such as calcium ions from the resin with less objectionable ions such as sodium ions. The replacement is usually performed by introducing a regenerant solution of sodium chloride or potassium chloride into the resin bed from a brine tank, and thereafter flushing the regenerant solution from the bed, i.e., brining.

Traditional systems triggered regeneration at specific times, such as once a week, based on assumptions regarding water usage and water hardness. These assumptions often proved faulty, leading to undesirably delayed or advanced regeneration. Current, more sophisticated systems use a flow meter that tracks actual water usage and triggers regeneration after a predesignated volume of water has been treated, oftentimes using a timer to advance regeneration to a time of day, such as during the nighttime, when demand is low. These systems are more reliable than those relying solely on timers, but still necessarily rely on error-inducing assumptions such as the hardness of the water being treated.

A more precise method using conductivity probes have been used in water softener control systems for monitoring the status of a water softener resin bed by measuring the conductivity of the resin in the tank. While this method has been used for years it has suffered from reliability, sensitivity, and integration issues. Conductivity changes during the resin depletion process as the resin transforms from a sodium state to a calcium state and becomes less conductive. Probes can measure these changes and trigger an appropriate response ranging from initiation of a regeneration cycle to simply generating a warning.

Conductivity measurements typically are obtained by transmitting a periodic carrier signal through the probes and periodically sampling the readings. The magnitude of these signals is relatively small, especially at low ion concentrations resulting from salt efficient regeneration. Ion exchange resin can be regenerated with a range of salt doses. Two to eighteen pounds of salt per are typically provided per cubic foot of resin. Higher doses give higher softening capacities while lower doses give greater efficiency of sale usage. Regenerations on the order of five pounds per cubic foot of resin give reasonable capacity and efficiency. Salt efficient regeneration makes conductivity sensing difficult, as the sodium ion concentration in the regenerated state is lower. This results in a smaller signal difference between regenerated and depleted resin. The resultant low signal-to-noise ratio hinders accurate conductively measurements.

In addition, known water treatment systems do not take full advantage of the capabilities of obtaining both flow usage data from flow meters or the like and conductivity data from conductivity probes. Controls therefore remain relatively unsophisticated.

For example, traditional water treatment systems have a single probe located at the assumed or "nominal" mid-point of the resin bid. However, in practice, the height of the resin bed within the tank varies considerably depending on the quantity of resin that is supplied to the tank. The "nominal midpoint" assumption thus might not be accurate. The resulting signals can provide inaccurate information regarding the remaining volumetric capacity of the tank. More sophisticated systems have two or more spaced probes to provide more precise information, but these systems still do not position the probes at strategic locations within the tank or use the data from those probes for truly precise volumetric capacity measurements.

In addition, the probes of typical conductivity monitors are hard-wired to a circuit board, located externally of the tank, by wires inserted through the sidewall of the tank. These wires breach the integrity of the tank with attendant risk of leaks.

The need therefore has arisen to provide a water treatment system that can accurately measure the volumetric capacity of a water treatment tank.

The need additionally has arisen to provide a more accurate and reliable conductivity monitor for a water treatment system and to water treatment systems having such a monitor.

The need also has arisen to provide a water treatment device having a water conductivity monitor that is relatively inexpensive and leak resistant as compared to traditional water conductivity monitors.

SUMMARY OF THE INVENTION

According to one aspect of the invention, a water treatment system is provided having a water treatment tank, a conductivity monitor, a valve assembly, a flow meter, and a controller. The tank is configured to store ion exchange media and includes a peripheral wall, a bottom end, and a top end. The conductivity monitor comprises at least first and second probes spaced vertically from one another within the tank in a portion of the tank that is configured to contain the ion exchange media. The control valve assembly is switchable to selectively permit untreated water flow into the tank, treated water flow out of the tank, and regenerant flow into and out of the tank. The controller is in operative communication with the probes and the control valve assembly and is operable to actuate the control valve assembly based at least in part from signals received from the conductivity monitor.

In one configuration, at least two probes are provided in the tank, with the uppermost probe being located near the nominal mid-point of the resin bed and the second probe being located halfway between the first probe and the nominal bottom of the resin bed. Signals from these probes are used in combination with flow data as measured by a flow meter to provide precise information regarding volumetric capacity as depletion is registered at each probe.

In one implementation of this aspect, the controller, at the end of a regeneration phase of the treatment cycle, assumes or estimates a total volumetric treatment capacity ETVC using any of a variety of a known techniques. This ETVC is used as the system's volumetric capacity until the uppermost probe registers depletion. At this time the actual volume of water that has been treated since regeneration ($AV_{P1}$), as measured by the flow meter is used to determine the actual total volumetric capacity ATVC. $2AVp1=ATVC$. This is not precise due to the estimated mid-point placement of the first probe, but is refined when the second probe registers depletion. Upon detection of depletion at the second probe, the system measures the volume of water flowing through the tank between registration of the first and second probes ($AV_{P1-P2}$) and calculates a new or updated total volumetric capacity $UATVC=2(AV_{P1-P2})+AV_{P1}$. UATVC and its derivatives can then be used for future calculations requiring knowledge of total or prevailing volumetric capacity. This calculation is accurate as the vertical spacing between the first and second probes is equal to the spacing between the second probe and the bottom of the bed. The various determined UATVCs can then be used in future calculations to give more accurate determination with just the depletion to the level of probe 72.

A third probe may also be provided near the nominal bottom of the resin bed. Ideally, the spacing between the second and third probes should be the same as the spacing between the first and second probes or, stated another way, the second probe should be positioned half-way between the first and third probes. Registration of depletion at the third probe will indicate actual or imminent exhaustion of the resin bed.

In one configuration, the controller is configured to periodically transmit an excitation signal through the probes that produces an output signal at each probe that is dependent on the prevailing conductivity at the probe, sample the output signals from each of the probes, and determine a change in conductivity at the first probe based on a comparison of the output signals from the first and second probes.

In one implementation of this configuration, the controller is additionally configured to obtain at least some of the samples obtained with a delay of no more than 1 millisecond and, more typically, no more than 5 microseconds, from the beginning of the corresponding cycle.

In another implementation of this configuration, the system's controller is configured such that signals from the probes are periodically normalized to maintain measurement accuracy. Normalization may occur, for example, at the end of each regeneration cycle. Normalization may entail determining one or more scaling factors required to match the first data readings from the probes. In a three-probe system, data from the second and third probe is normalized to match the data from the first probe. Thereafter, each data reading for each of the second and third probes is multiplied by its respective scaling factor.

In accordance with still another aspect of the system, the water treatment system additionally includes a flow meter and a timer. The flow meter monitors flow through the tank, at least during the service cycle. The controller is configured, based on signals from the flow meter, to determine the volume of water that has been treated since the beginning of the service cycle. The resultant data can be used with historical data to control the next regeneration cycle.

In accordance with yet another aspect of the invention, measures are taken to reduce or prevent the risk of leaks associated with providing access holes in the tank for the passage of signal wires of the probes. In one example, the wires may pass through a sealed plug located in a top dome of the tank. In another example, signals from the probes are transmitted wireless via radio frequency communication using a first transceiver located within the treatment tank and a second transceiver positioned externally of the tank.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Embodiments of water treatment systems are disclosed herein that include a water treatment tank in the form of a resin tank, or "pressure vessel" fitted with a conductivity probe. Such tanks can be used with a variety of fluid treatment systems, including potable water treatment systems for residential use or commercial use. The most typical such system is a water softener having one or more resin tanks of the type disclosed herein and one or more brine tanks containing a regeneration medium such as sodium chloride or potassium permanganate. A control valve or system of valves controls the flow of untreated water into the resin tank(s), treated water out of the resin tank(s), and regeneration liquid between the resin tank(s) and the brine tank(s).

Figure 1:
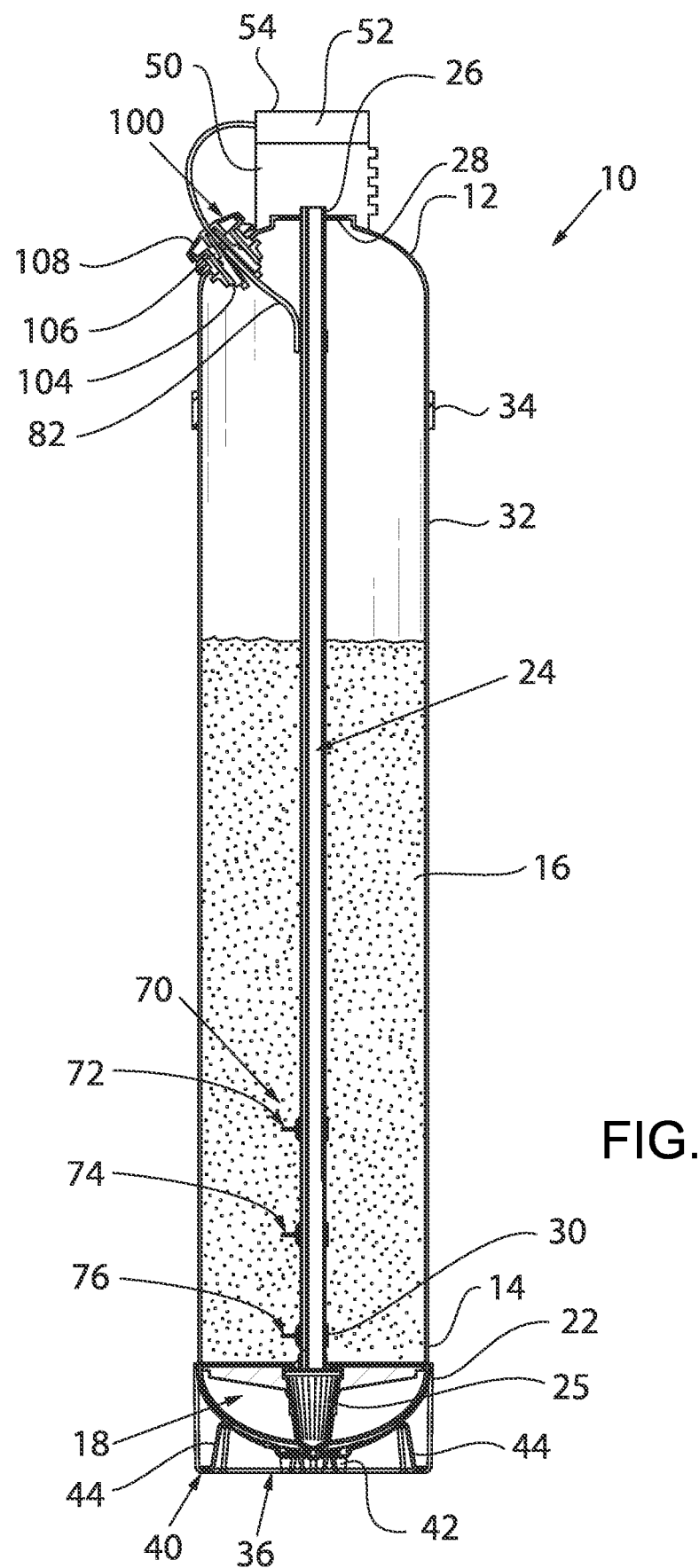
FIG. 1 is a sectional view of a resin tank of a water treatment system according to an embodiment of the invention.

Referring now to the drawings and, initially, FIG. 1, a pressure vessel or resin tank 10 for a water treatment system is generally cylindrically shaped, includes a top end 12 opposite a bottom end 14, and defines a resin bed 16 configured to store resin and water therein. One of a variety of water treatment systems with which the resin tank 10 is usable is a water softener system as disclosed in U.S. Pat. No. 6,402,944, (the '944 patent), the contents of which are incorporated herein by reference. The resin may be provided in the form of a plurality of plastic, e.g., polystyrene, beads. In one configuration, he bottom end 14 of the resin tank 10 defines a lower end portion 18 separated from the resin bed 16 by a distributor plate 22. In another configuration the resin is separated from the interior of the riser tube by a screen basket 25. The drawings show both configurations, it being understood that a tank would seldom, if ever, be fitted with both a distributor plate and a basket A riser tube 24 may be centrally positioned within the tank 10 and includes an upper end 26 that extends through an upper opening 28 of the tank 10. The annular space surrounding this opening 28 provides a second fluid port in the tank 10. The riser tube 24 also has a lower end 30. If present, the basket 25 is mounted on the lower end 30 of the riser tube 24. As mentioned above, the distributor plate can be omitted if a basket 25 is employed. The tank 10 may include a blow-molded plastic liner 32 reinforced over its entire outer surface by a layer 34 of fiberglass wrap or the like, only a portion of which is shown. The bottom 18 of the tank 10 is supported on a stand 36 having a plurality of profiled molded supporting ribs. 42 and 44.

Figure 3:
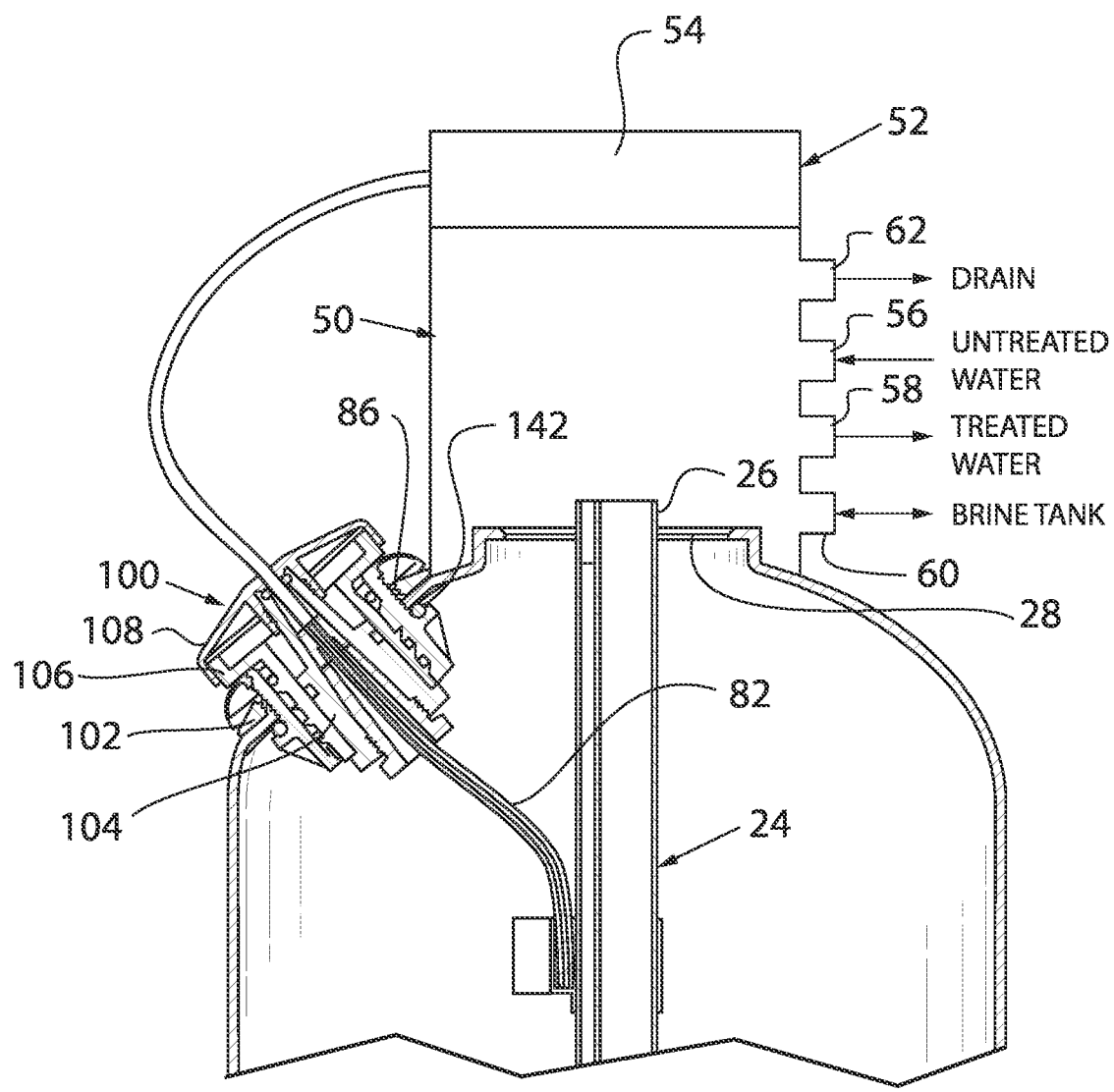
FIG. 3 is a detail view of an upper portion of the resin tank of FIG. 1.

Still Referring to FIG. 1, and with particular attention to FIG. 3, a control valve assembly 50 is threaded onto the top of the resin tank 10 over the opening 28. The control valve assembly 50 may be provided in a housing 52 that houses all electronics including a controller 54 and shown schematically in FIGS. 1 and 3. In addition to being in fluid communication with the riser tube 24 and the annular opening in the resin tank 10 surrounding the riser tube 24, the control valve assembly 50 is fluidically coupled to other items that are not shown, including untreated water inlet designated by port 56, a treated water outlet designated by port 58, the brine tank via port 60, and a drain line via port 62.

It should be noted that the control valve assembly 50 need not take the form of a unitary assembly as illustrated. The valve assembly 50 instead could be replaced, in whole or in part, by other valves interconnecting the various components of the water softener. These valves still would be controlled by the controller 54.

In operation of the illustrated water conditioning system, as incoming hard water flowing through the valve assembly 50 from port 56 enters the resin tank 10 through the opening 28 in the top of the resin tank 10, the water in the resin tank 10 is forced through the resin bed 16 and through the distributor plate 22. (Or basket.) The treated water then flows up through the riser tube 24, into the control valve assembly 50 from below, and out of the treated water outlet 58.

The capacity of the resin bed 16 to exchange ions with the minerals and impurities in the incoming hard water is finite, and depends on (1) the treatment capacity of the resin bed 16 as measured in kilograms of hardness or grams of $CaCO_3$ and (2) the hardness of the incoming water as typically measured in grains per gallon. To regenerate the resin bed 16 once its treating capacity has been depleted, the resin bed 16 is flushed with the regenerant solution from the brine tank (not shown) so that the minerals and other impurities can be released from the resin bed 16 and carried out of the resin tank 10. During regeneration, water flows between the resin tank 10 and the brine tank via the port 60. All of these operations may take place, for example, in the sequence described in U.S. Pat. No. 6,402,944, the subject matter of which is incorporated by reference by way of background.

The regeneration cycle could be initiated using a timer that can serve to approximate the volume of water being treated by estimating the volumetric flow rate through the tank and dividing the known or estimated volumetric capacity of the tank by this rate to determine a time interval. That time could be supplemented by or replaced by a flow meter that directly monitors the volumetric flow rate through the resin tank 10. In the illustrated embodiment, regeneration is controlled by a conductivity monitor 70 (FIG. 5) that detects exchange media exhaustion by detecting changes in conductivity in the resin bed 16. In some implementations, data from a flow meter 66 and/or a timer 64 (FIG. 5) also are used to control operation of the valve assembly 50.

Figure 2:
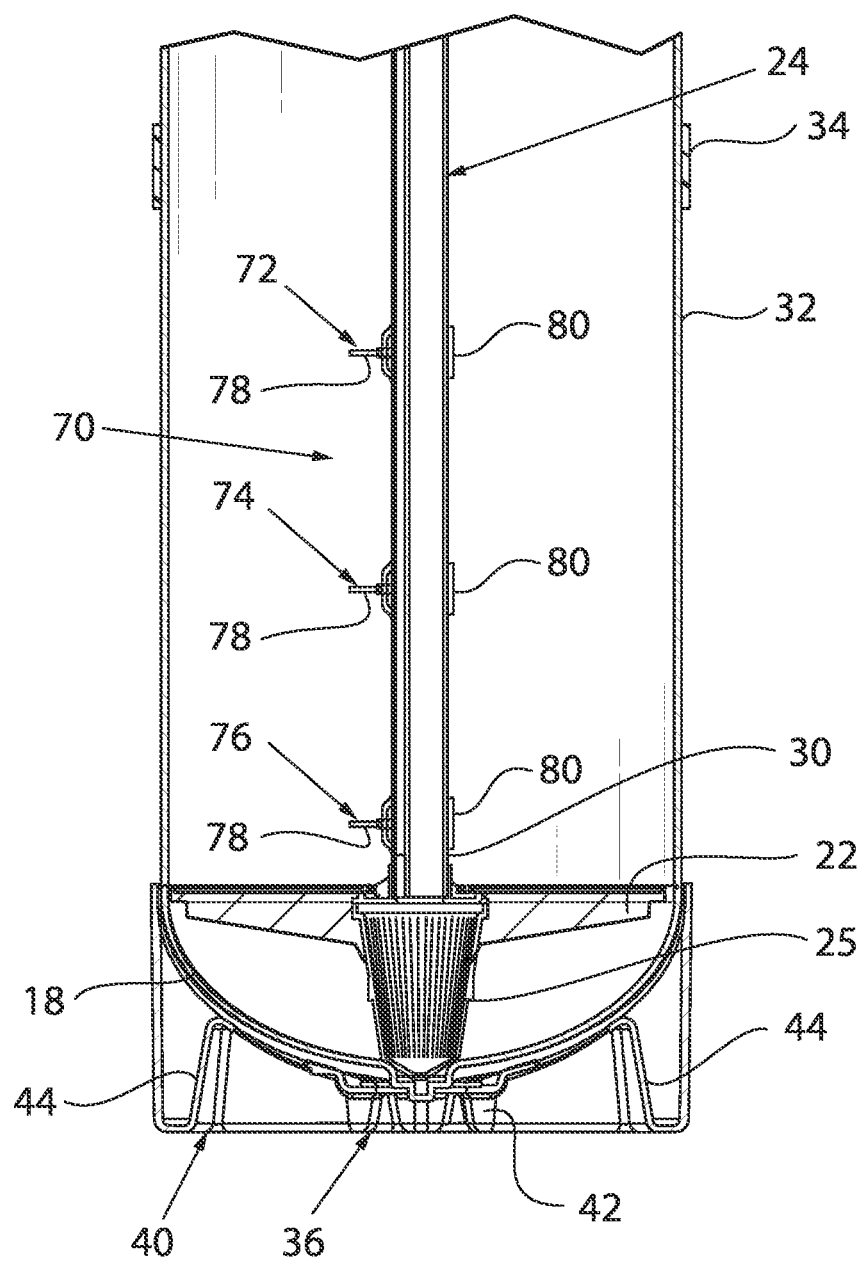
FIG. 2 is a detail view of a bottom portion of the resin tank of FIG. 1.

Referring now to FIGS. 1 and 2, the conductivity monitor 70 includes at least two, and more typically three or even more, probes mounted within the resin bed 16 in the tank 10 in a vertically spaced-apart relationship. The probes could be mounted on the side of the tank or, as illustrated, on the riser tube 24. Each probe includes a pair of horizontally spaced, electrodes (only one of which is shown at 78). The electrodes could be formed from a corrosion resistant metal or carbon. Examples of such materials include stainless steel or a corrosion-resistant nickel-based alloy such as Hastelloy C-22. Each probe is mounted on the riser tube 24 by a clamp 80 supporting both electrodes. It is also conceivable that the probes could be mounted on a support tube that is, in turn, clamped to or otherwise mounted on the riser tube 24. Wires or cables 82 are attached the electrodes and extend vertically through the tank 10 and out of an upper dome hole 86.

In the illustrated embodiment, three equally-spaced probes 72, 74, and 76 are provided. The vertical positioning of the probes 72, 74, 76 relative to each other and relative to the top and bottom surfaces of the resin bed 16 are largely a matter of designer preference, typically based on desired capabilities and bearing in mind that the probes 72, 74, 76 are designed to generate signals indicative of reduced exchange efficiency. The probes typically will be positioned within the bottom half of the resin bed 16. The first, or uppermost probe is located at or near (typically within 6") of the "nominal" mid-point of the depth of the resin bed, it being understood that actual bed depths vary considerably in practice due, for example, to errors by technicians when filling the tank with resin. The third probe 76 is located at or near the bottom of the bed, typically within 6" of the bottom of the resin bed 16. The second probe 74 is located mid-way between the first and third probes 72 and 76.

Figure 4:
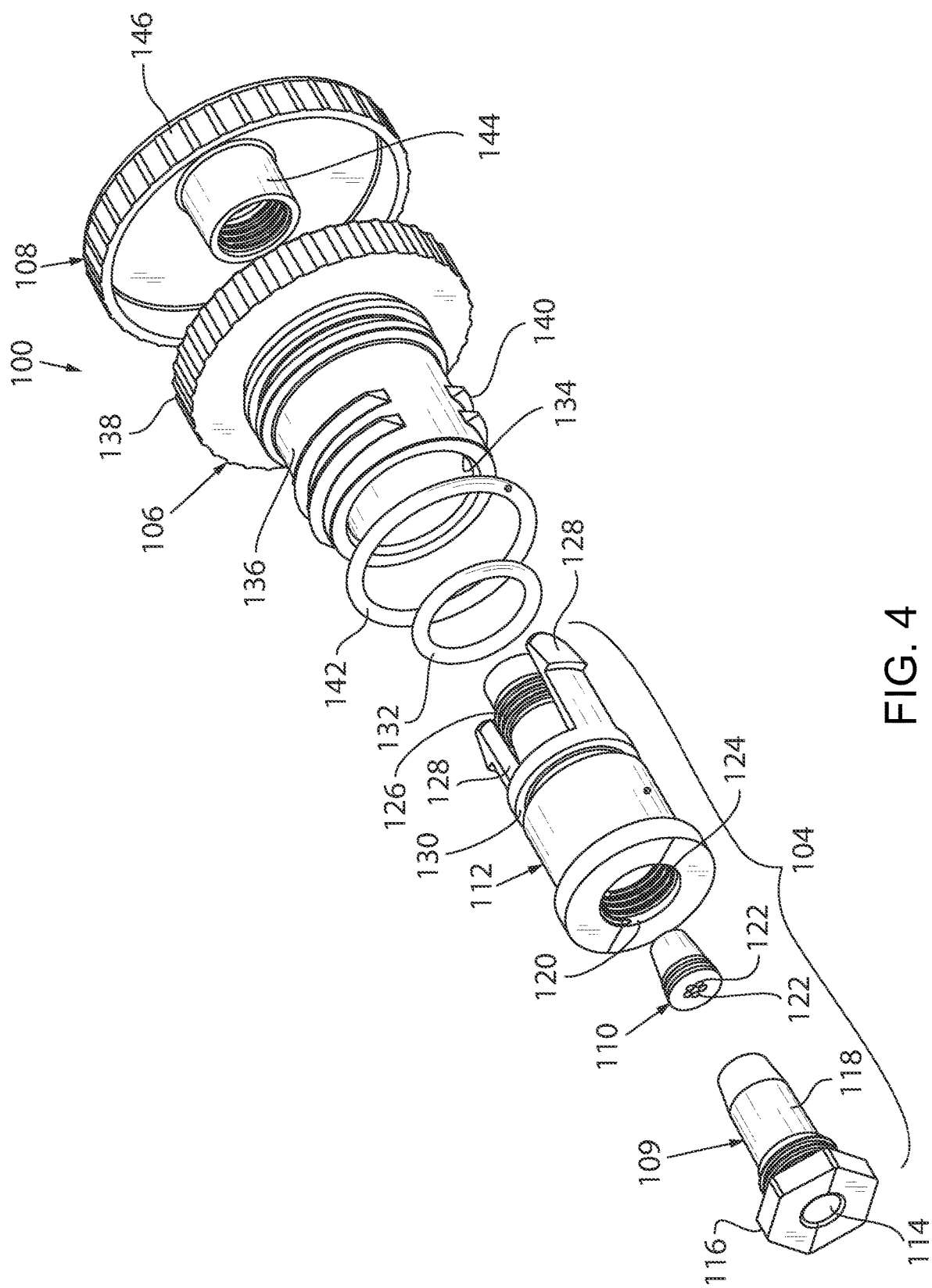
FIG. 4 is an exploded isometric view of a dome hole plug of the resin tank of FIG. 1.

Referring to FIGS. 3 and 4, a dome plug assembly 100 is configured to seal the dome hole 86 of the resin tank 10 while providing a chase for the wires 82 that couple the controller 54 to the probes 72, 74, and 76. The dome plug assembly 100 is threaded into an injection molded insert 102 (FIG. 3). The dome plug assembly 100 includes, from inner to outer ends, a cartridge assembly 104, an outer plug 106, and an outermost cap 108. The cartridge assembly 104 is sealingly received in the outer plug 106, and the resultant assembly is covered by the cap 108.

Referring especially to FIG. 4, the cartridge assembly 104 includes an inner plug 109, a rubber seal plug 110, and a cartridge body 112. The inner plug 109 is a rigid plastic element having a central bore 114, an inner head 116, and an outer body 118. The outer body 118 is threaded just outboard of the head for engagement with an internally-threaded bore 120 in the cartridge body 112. The rubber seal plug 110 is tapered from inner to outer ends. It has a number of throughbores 122 matching the numbers of wires in the cable.

Still referring to FIG. 4, the throughbore 120 in the cartridge body 112 is internally threaded at its inner end. The diameter of the inner end of the throughbore 120 is smaller than the maximum diameter of the rubber seal plug 110. The outer end portion of the cartridge body 112 is threaded at 126 for engagement with the end cap 108. In addition, snap hooks or barbs 128 are provided near the outer end of the cartridge body 112 for engagement with the outer plug 106. A groove 130 is provided inboard of the snap-hooks 128 for receiving an O-ring 132 that engages the inner periphery of a throughbore 134 in the outer plug 106.

Still referring to FIG. 4, the outer plug 106 has the throughbore 134, an inner tubular body 136 that is externally threaded at its outer end (FIG. 3), and an outer head 138. Outer plug 106 also has a groove 140 for receiving an O-ring 142. Finally, the outer cap 108 has an internally threaded inner boss 144 and an outer cover 146 fitted with a peripheral hand grip.

Referring to FIGS. 3 and 4, during assembly, the wires 82 are first threaded through the throughbore 114 in the inner plug 109, the respective bores 122 in rubber plug 110, and the throughbore 120 in the cartridge body 112. The rubber plug 110 and inner plug 109 are then inserted into the throughbore 120 in the cartridge body 112 from the inside end, and the inner plug 109 is screwed into the threads 124 in the throughbore 120 of the cartridge body 112. During this motion, the rubber plug 110 is wedged into the smaller-diameter outer end of the throughbore 120, compressing the plug 110 and sealing the bores 122 that receive the wires 82. The cartridge body 112 is then inserted through the bore 134 in the outer plug 106 until the snap hooks 128 engage a mating shoulder or other cooperating structure on the outer plug 106 as shown in FIG. 3. The O-ring 132 seals the cartridge body 112 against the outer plug 106 at this time, thus completing assembly of the cartridge assembly 104. Then, after the wires 82 or a cable containing them are fed through the bore 134 in the outer plug 106 and the boss 144 in the end cap 108, the outer plug 106 is threaded into insert 102 in the dome hole 86, drawing the O-ring seal 142 into mating engagement with the inner surface of the insert 102 and sealing the outer plug 106 to the insert 102. Finally, the cap 108 is threaded into engagement with the threads 126 on the outer end portion of the cartridge 136 to cover the outer end of the plug assembly 100. The resulting plug assembly 100 provides a secure, fluid tight chase for the passage of the wires of the conductivity monitor cable.

Figure 5:
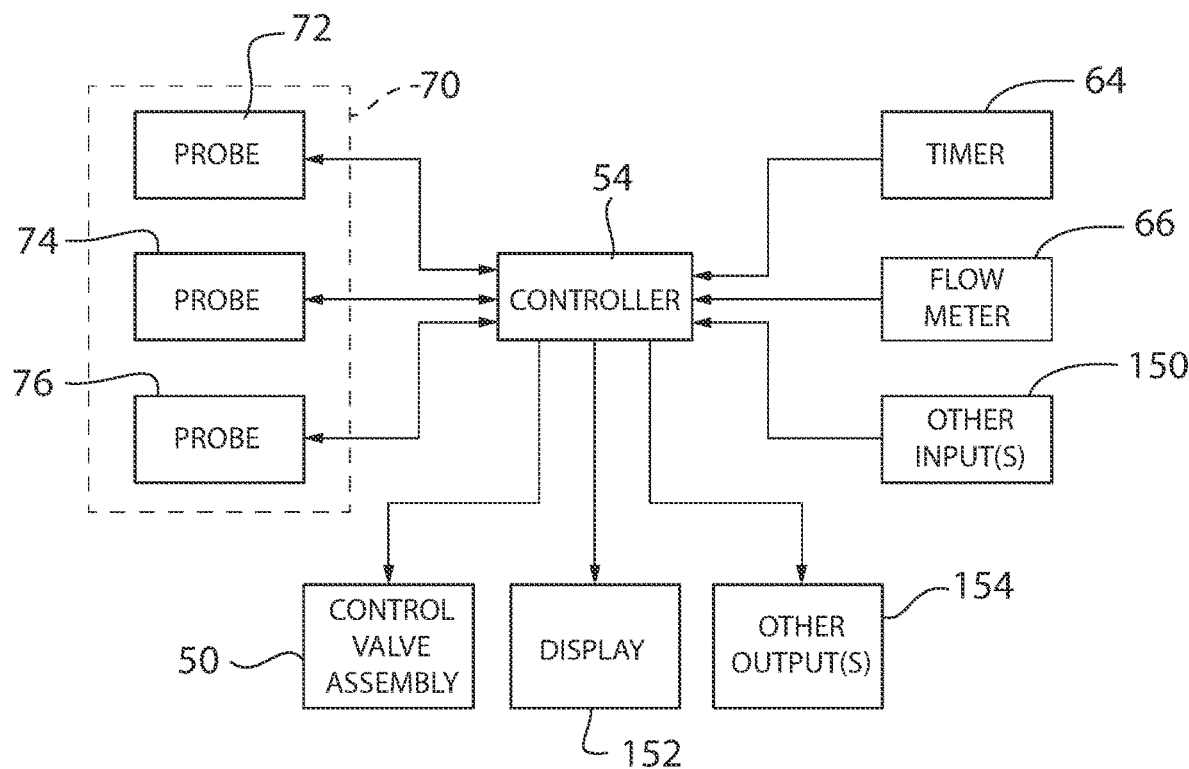
FIG. 5 schematically illustrates a control system of the water treatment system of FIGS. 1-4.

Turning now to FIG. 5, the electronically controlled components of the water treatment system are schematically shown. These components include the conductivity monitor 70 (including probes 72, 74, and 76), a controller 54, and the control valve assembly 50. The controller 54 typically will include a microprocessor including a RAM and a ROM such as EEPROM. It also will include or be coupled to a carrier signal generator and processors for the signals from the probes 72, 74, 76, including A/D converters and filters. Other components that might be connected to the controller 54 include the timer 64, the flow meter 66, other sensor(s) or input(s) 150 such as a temperature sensor, and a display 152 providing audio and/or visual indications of system or component status. The display 152 could be located on the controller housing (FIG. 3) and/or be located remotely from the housing 54 and coupled to the controller 54 either by a wired or wireless connection. The display 152 could even be generated by an app on a smart phone or the like. Other output(s) 154 also could be provided, such as other controlled elements whose operation may depend on prevailing water quality.

In operation, the controller 54 generates a current that is transmitted to one of the electrodes of each probe 72, 74, 76. A return voltage is generated by current flow through the exchange media to the adjacent return electrode of each probe. The magnitude of that voltage is dependent on the conductivity of the media connecting electrodes which, in turn, is highly dependent on the conductivity of the resin media. However, it is always relatively low, typically having a peak ranging from 100 mv to 200 mv, when the exchange efficiency of the surrounding resin is at a maximum to about 250 mv to 300 mv when the surrounding resin is completely exhausted. These values could be smaller or larger. However, smaller values would risk losing the signal in background noise, and larger values could risk causing galvanic corrosion on the electrodes. As untreated water enters the resin tank 10 and flows through the resin bed 16 from above, the upper portion of the resin bed becomes exhausted first. As the exhaustion continues, an interface, or front, between the exhausted and unexhausted resin moves downward through the bed 16 over time. Eventually, the exhaustion front moves past the uppermost probe 72. The conductivity at this probe 72 changes, thereby producing a measurable change in the current flowing through that probe 72. This detection alone could be used to detect depletion in the area of the uppermost probe 72. However, conductivity readings can be adversely affected by other factors, such as water conductivity and temperature. These other factors can be compensated for by comparing the readings from two probes, with the subtraction or other comparison of the data from the probes removing or at least mitigating the effects on these other factors. Hence, depletion at the first probe 72 is monitored by comparing readings from the first probe 72 with those of the second probe 74 and/or the third probe 76, and depletion at the second probe is monitored by comparing readings from that probe with those of the third probe 76 and/or the first probe 72. Finally, depletion at the third probe 76 is monitored by comparing readings between that probe with those of the first probe 72 and/or the second probe 74. The comparison may take the form of a subtraction, the calculation of a ratio, or more complex calculations such as the ratio of a square of the readings. In any event, detection of depletion at the respective probes may generate progressively-more severe or aggressive responses. For example, detection of depletion at the first probe 72 may trigger a simple visual notification on the display 152; whereas detection of depletion at the second probe 74 may trigger generation of a notification that regeneration will be necessary soon, or may be used in conjunction with timer 64 to trigger regeneration at the next convenient time. Finally, movement of the exhaustion front past the third or lowermost probe assembly indicates complete exhaustion. The resulting signal can trigger audio or visual warnings on the display and/or immediate regeneration. More sophisticated control schemes are possible as well as described below.

Figure 6:
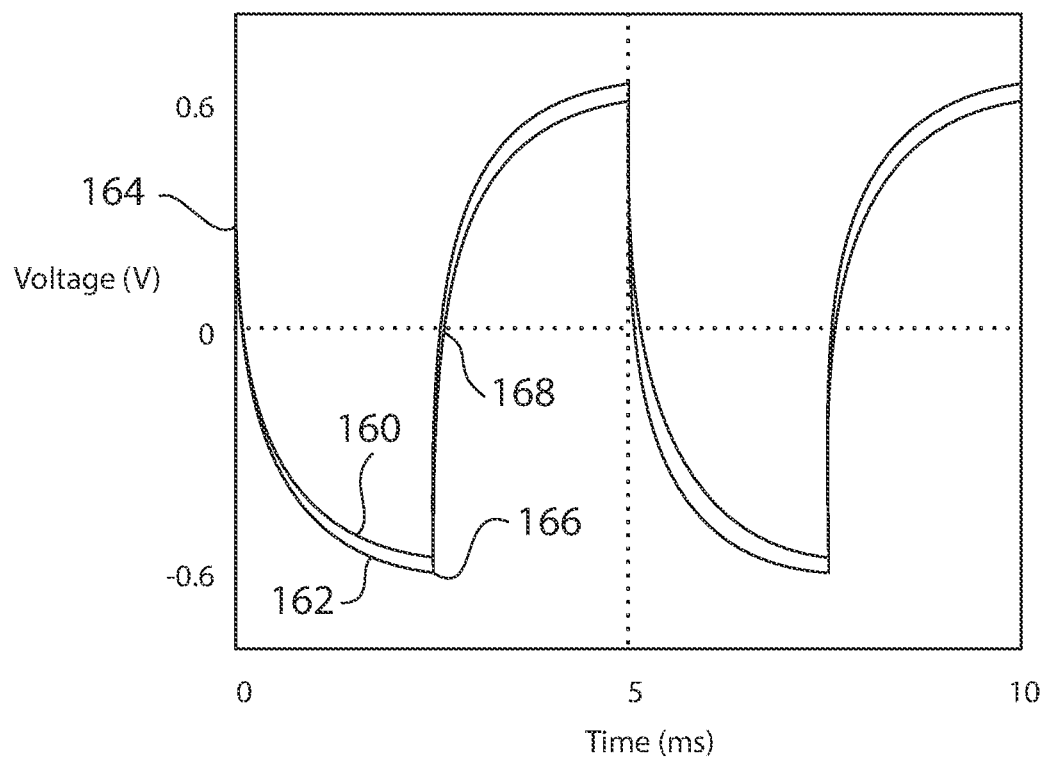
FIG. 6 is a graph of a portion of a waveform signal produced by the conductivity monitor of the water treatment system of FIGS. 1-4.

The manner in which data is acquired to obtain the readings described above now will be described. As discussed above, signals at each probe 72, 74, 76 takes the form of a waveform, typically a square waveform. FIG. 6, which plots readings from the first or upper probe 72 (curve 160) and second or center probe 74 (curve 162) in terms of voltage vs time as recorded by an oscilloscope in an experimental system after passage of a depletion front past the first probe 72. The horizontal X axis is time in msec. The Y or vertical axis is voltage. Each signal has a period of about 5 msec and a peak-to-peak voltage of about 1.2V. It can be seen that the signals output from the probes 72 and 74 are not perfect square waves but, instead, tend to be rather sawtooth shaped, having a leading edge 164, a trailing edge 168, and a peak 166 located between the leading edge 164, and a trailing edge 168. A comparison of the curves 160 and 162 reveals that the shape of the signal produced by the second probe 74 is more rounded, or less square, than the shape of the signal produced by the first probe 72 upon depleted of the resin at the probe 72. As a result, the difference between the two curves 160 and 162 is larger at the leading edges 164 of the signals than at the peaks 166. This small difference at the peaks hinders the ability of the system to detect subtle differences between the two signals. These peak differences in signals between fully regenerated and depleted resin are only about 5% of the total. This problem is exacerbated by the fact that resin beds typically employ relatively low salt concentrations.

The more pronounced difference between the two curves 160 and 162 early in the cycle is believed to result from the fact that each signal has two components, a first, resistive component and a second component that builds over time due the transfer of ions between the electrodes of each probe. The second component therefore can be thought of as a capacitive component to the extent it builds over time. The capacitive component swamps the conductive component or, stated another way, dominates the signal, before a given cycle segment reaches its peak. Since the differential between the two resin states is largely due to the resistive component, a greater differential can be observed if data is captured before the capacitive component dominates the overall signal. The goal, therefore, is to take the reading when the capacitive component of each signal has the least effect on the signal, leading to a maximum difference between the two signals.

In one implementation, readings are taken in the following sequence:

1. One electrode of the uppermost probe 72 is driven high and the other is driven low.
2. 3.94 micro seconds later, the voltage reading is taken on the first, positive electrode of probe 72.
3. 6.15 micro seconds after the reading from the first electrode of probe 72 is taken, the voltage application to both electrodes are held low.
4. 5 milli seconds later, the applied voltage to the second electrode of probe 72 is driven high and the first electrode is held low.
5. 3.94 micro seconds later, a voltage reading is taken from the second of probe 72 electrode.
6. 6.15 micro seconds later, the voltage application to both electrodes of probe 72 are held low.
7. The sequence 1 through 6 is repeated again after a 5 milli second delay.
8. The sequence 1 through 7 is repeated 3 times on the first probe 72, thus taking four sets of readings.
9. 20 milliseconds after the last of four sets of readings is taken from the first probe 72 is taken, the sequence 1 through 8 is repeated on second, intermediate probe 74.
10. 20 milliseconds after the last of the four readings from the second probe 72 is taken, the procedure of steps 1 through 8 is repeated from the third, lowermost probe 76.

Figure 7:
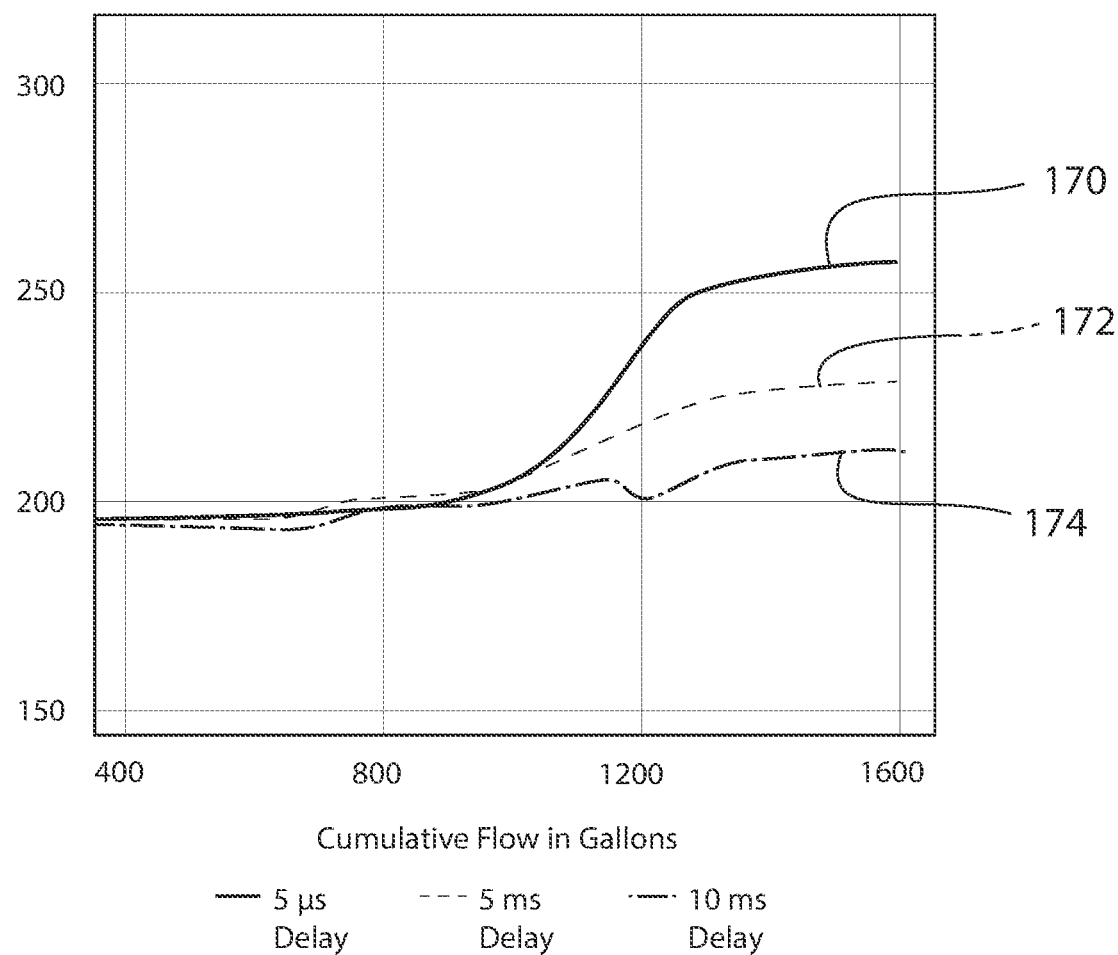
FIG. 7 graphically illustrates conductivity measurements taken at various points in a periodic excitation cycle of the conductivity monitor of the water treatment system of FIGS. 1-3.

The results of the improved sensitivity obtainable by taking readings at the leading edge of each curve segment rather than at the peak is further demonstrated by the graph of FIG. 7. The curves represent voltage reading at the uppermost probe 72 at delays of 5 microseconds or 200% into the period of the 5 microsecond cycle (curve 170), 5 milliseconds or 10% into the period of the 5 microsecond cycle (curve 172), and 10 milliseconds or 20% into the period of the 5 microsecond cycle (curve 174) as a function of flow volume as measured by flow meter 66. The 10 millisecond delay approximates that associated with standard techniques that take readings at voltage peaks rather than early in the cycle. The data for the curves 172 and 174 and was normalized to the data for 170 make the magnitude of signals equal. Because of the curve shape different delays result in different magnitude signals. Hence, in the illustrated example raw data, not shown, was normalized so all delays started at the same value, the first reading of 310 mv that was taken with a 5 microsecond delay, or 10% into the duration of the cycle, of 310 mv was multiplied by a scaling factor 0.64 to normalize that reading to the corresponding reading of 197 mv that was taken with a 5 microsecond delay. The first reading with a 10 millisecond delay, or 20% into the duration of the cycle, similarly was multiplied by a scaling factor of 0.49 to normalize the reading of 401 mv with the reading of 197 mv obtained with a 5 microsecond delay. Thereafter, all readings with a 5 millisecond delay were multiplied by the 0.68 scaling factor, and all readings with a 10 millisecond delay were multiplied by the 0.49 scaling factor.

The same normalizing technique can be used during normal operation of the system to normalize data from the second and third probes 74 and 76 to that of the first probe 72. Hence, at the end of each regeneration cycle, first and second scaling factors are calculated in the form of multipliers required to match the initial raw data point for the second and third probes 74 and 76, respectively, to the first data point for the first probe 72. Thereafter, each data reading for each of the second and third probes is multiplied by its respective scaling factor to obtain a normalized reading for that data point. In one example, the initial raw readings from probes 72, 74, and 76 were measured to be 286, 250, and 260 respectively. Scaling factors of 1.164 and 1.100 were calculated for the data from probes 74 and 76, respectively. These scaling factors of 1.164 and 1.100 were thereafter used to normalize the raw readings from probes 74 and 76, respectively, for the remainder of the service phase of the water treatment cycle.

Referring again to FIG. 7, as one would expect, the data in all three curves 170, 172, and 174 remained constant until the depletion wavefront began to pass probe 72 at about 800 gallons. All three curves then increased progressively until complete passage of the wavefront at about 1400 gallons. A comparison of the curves 170, 172, and 174 in FIG. 7 indicates that the detectable increase was much greater for a 5 microsecond delay than for a 10 millisecond delay or even a 5 millisecond delay. At 1400 gallons, the reading of 259 mv with a 5 microsecond delay was 6% higher than with a 5 millisecond delay and 21% higher with 10 millisecond delay. The curves 170, 172, and 174 thus demonstrate that advancing measurements to less than 1 millisecond therefore can provide a more than fivefold increase in sensitivity when compared to standard techniques.

The readings taken from the conductivity monitor 70 can be used to provide very accurate measurements of the used and remaining volumetric capacities of the resin tank which, in turn, permits implementation of precisely controlled regeneration cycles. Examples of such cycles range from simply initiating regeneration immediately upon detection of complete resin depletion in the tank at probe 76 to delayed or predictive regeneration that takes water usage over time into account and that triggers regeneration at a desired time, such as late at night or another time of day when average demand is low. These more sophisticated systems combine data from the conductivity monitor 70 with volumetric flow data as measured by the flow meter 66 and time-based measurements using the timer 64.

In one example of a delayed regeneration control, which is particularly well-suited to a single tank system, the conductivity monitor 70 can be used to determine the actual volumetric capacity of the resin bed 16, which can be used with a learned variable reserve to optimize efficiency. Actual water usage as measured by the flow meter 66 is recorded as a function of time as monitored by the timer 64. The second highest usage for the last four weeks can recorded as the anticipated next day's usage. To account for varying water use patterns, just prior to a scheduled regeneration, this recorded anticipated next day's usage value is adjusted based on the relationship between today's usage and the recorded value for today's usage. If today's actual usage is higher than the previously-recorded usage value for today, the anticipated usage for tomorrow is adjusted upwardly by a similar amount. If today's actual usage is lower than today's recorded usage, the anticipated usage for the next day is adjusted down by half the amount.

Figure 8:
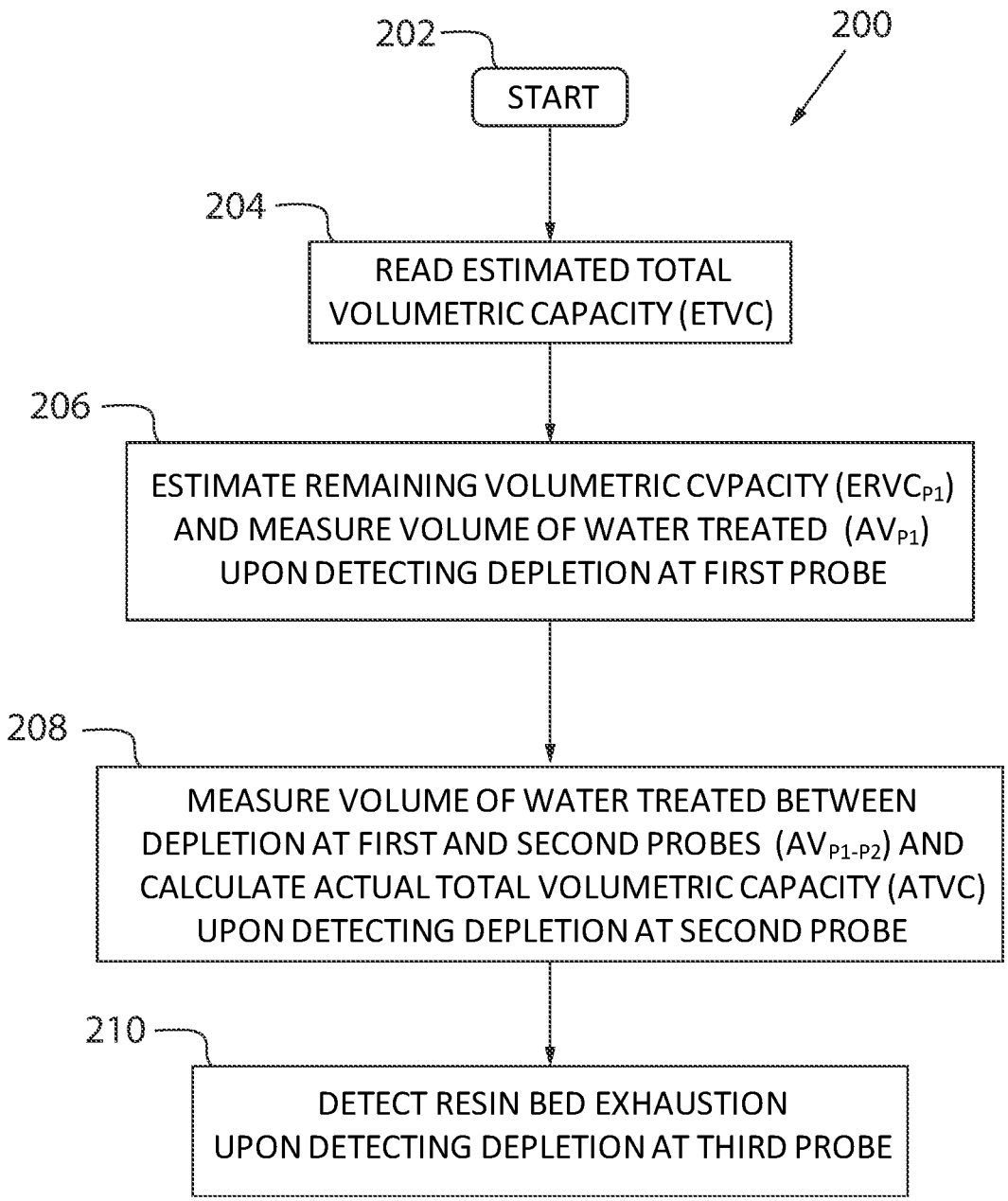
FIG. 8 is a flowchart of a process for determining volumetric capacity of the resin tank of FIGS. 1-3 using measurements from the conductivity probe of FIGS. 1-5 and the flow meter of FIG. 5.

In one implementation of the system, the total and pre-vailing, or stated another way, remaining volumetric capacities of the ion exchange media in the resin tank 10 can be determined using data from the flow meter 66 and the conductivity monitor 70. Turning now to FIG. 8, a routine 200 for making these determinations proceeds from START at Block 202 at the beginning of a service phase of the treatment cycle to Block 204, where the controller 54 reads a prestored assumed or estimated a total volumetric capacity ETVC that was determined previously using any of a variety of a known techniques based on the characteristics and volumes of resin in the tank 10 and assumed characteristics of the water being treated. During the service phase of the water treatment cycle, a depletion wavefront proceeds downwardly through the resin bed 16 as described above. When the uppermost probe 72 registers depletion, the actual volume of water that has been treated since regeneration ($AV_{P1}$) as measured by the flow meter 66, is used to determine the actual total volumetric capacity ATVC of the resin bed using the equation: $ATVC=2AV_{P1}$. As shown in Block 206, the system may also determine an estimated remaining volumetric capacity $ERVC_{P1}$ at this time using the equation: $ERVC_{P1}=\frac{1}{2}$ ETCV. These values are not precise due to the estimated mid-point placement of the first probe 72. Then, in Block 208, upon detection of depletion at the second probe 74, the system measures the volume of water flowing through the tank between registration of the first and second probes 72 and 74 ($AV_{P1-P2}$) and calculates a new total volumetric capacity of the resin bed ATVC=2 ($AV_{P1-P2}$)+$AV_{P1}$. ATVC and its derivatives can then be used for future calculations requiring knowledge of total or prevailing volumetric capacity. Finally, registration of depletion at the third probe 76 at Block 210 will indicate actual or imminent exhaustion of the resin bed 16.

Of course, as should be apparent from the discussions of various regeneration techniques above, the resin bed 16 need not and usually will not be exhausted in any given service cycle. Regeneration instead will usually, if not always, commence before detection of depletion at the third probe.

Figure 9:
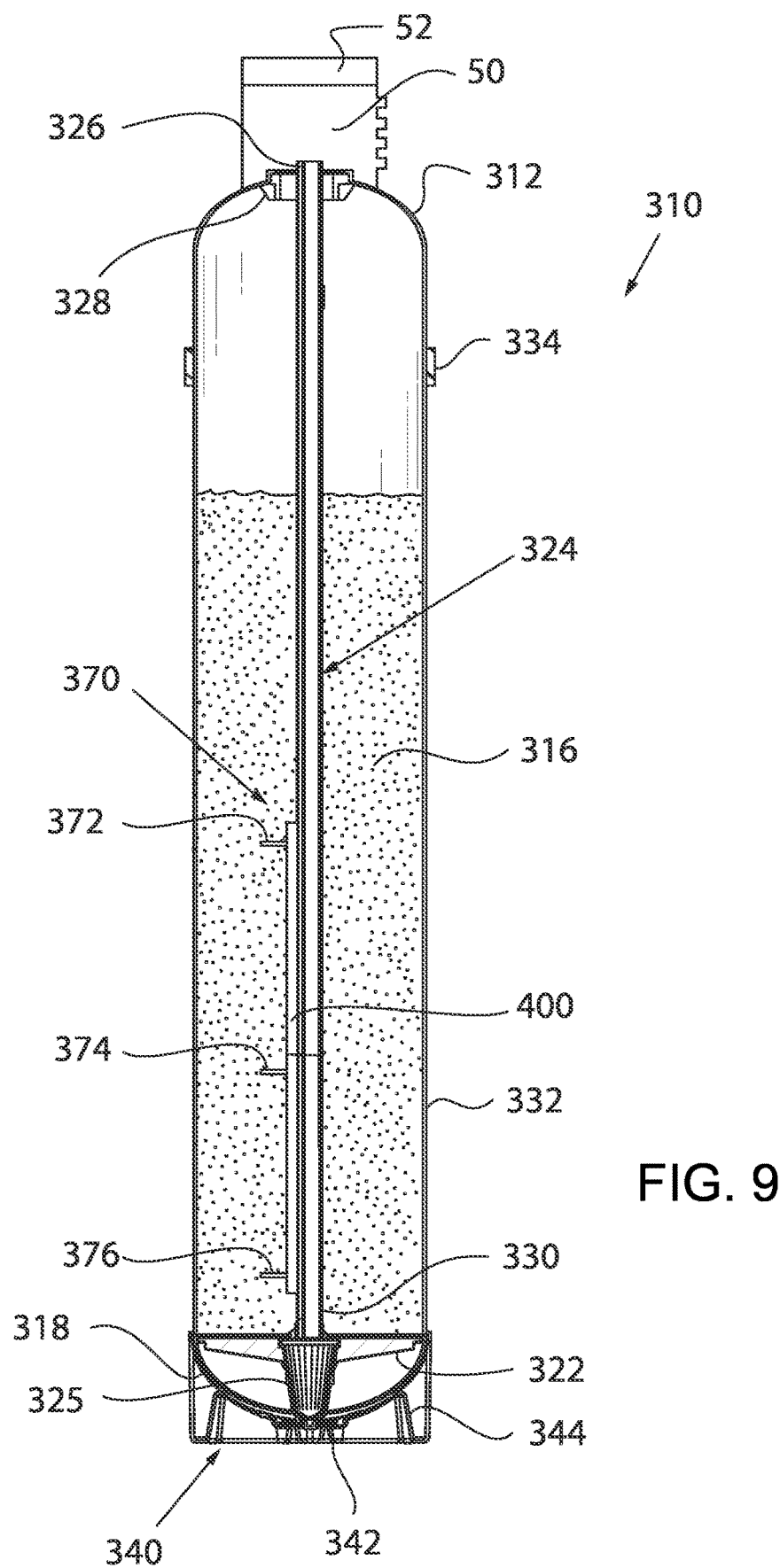
FIG. 9 is a sectional view of a resin tank of a water treatment system according to a second embodiment of the invention.
Figure 10:
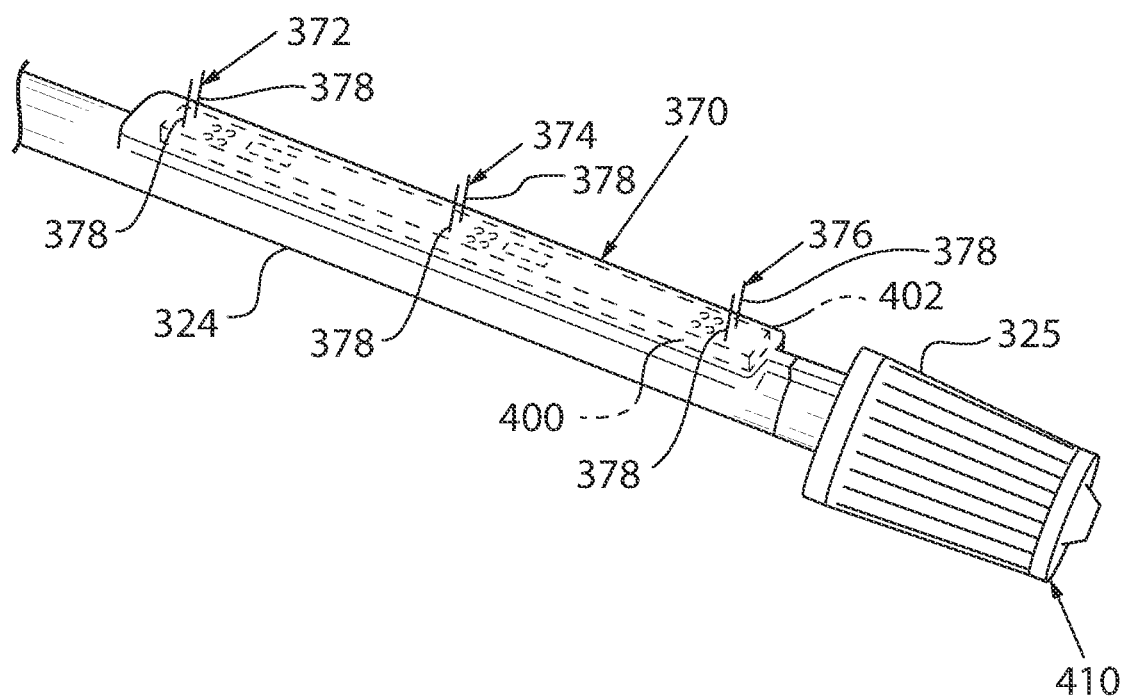
FIG. 10 is a detail view of a bottom portion of the resin tank of FIG. 9.
Figure 11:
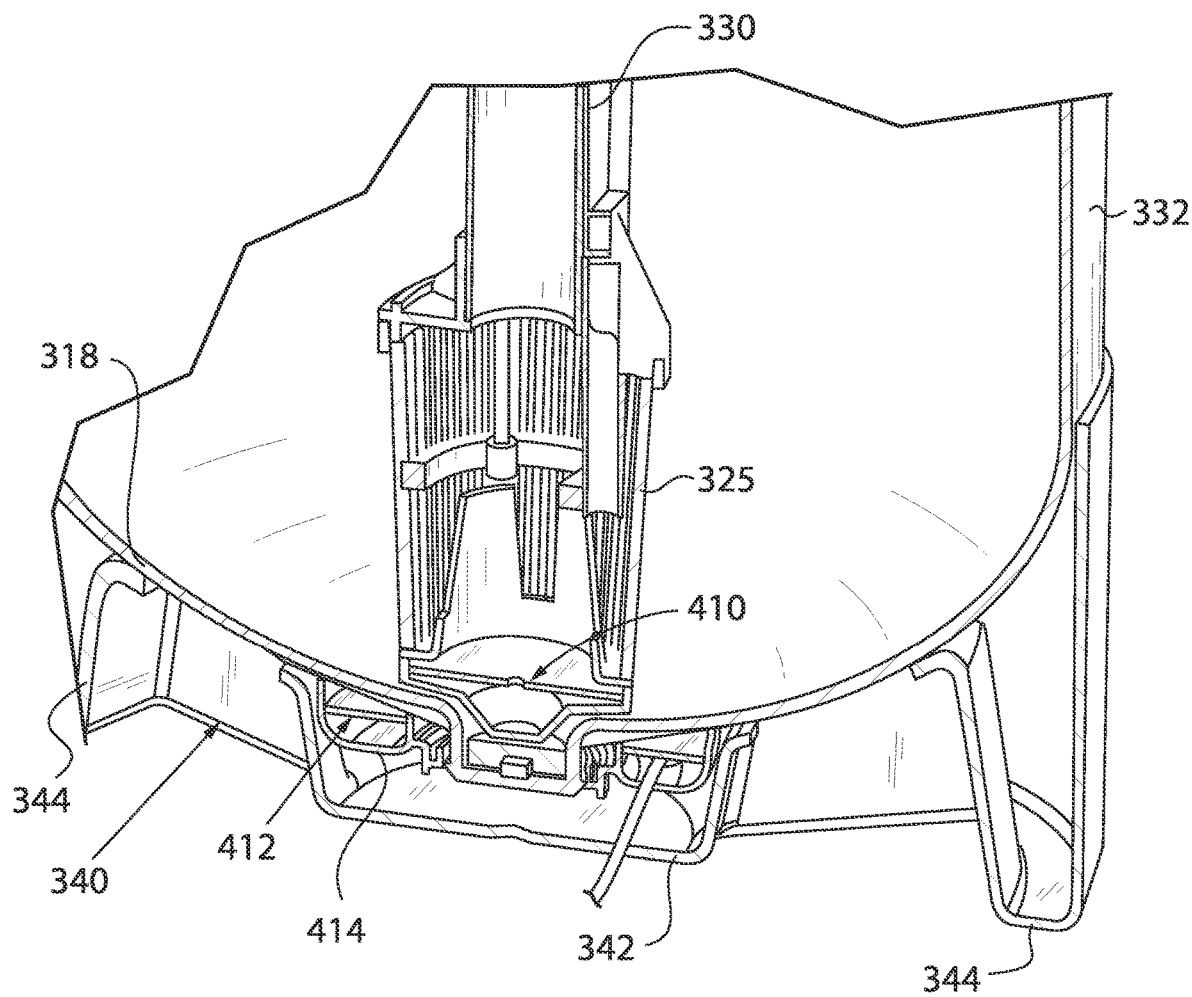
FIG. 11 is an isometric view of a conductivity monitor of the resin tank of FIG. 9.

Turning now to FIGS. 9-11, a resin tank 310 is shown which is provided with a conductivity monitor constructed in accordance with a second embodiment of the invention. The tank 310 is usable with the same water softener system described above using the same control strategy discussed above in conjunction with FIGS. 5-7, including data sampling and processing controls. Tank 310 thus is generally cylindrically shaped, including a top end 312 opposite a bottom end 318. The bottom end 318 of the resin tank 310 is separated from the resin bed 316 by a distributor plate 322. A riser tube 324 may be centrally positioned within the tank 310 and includes an upper end 326 that extends through an upper opening 328 of the tank 310. Opposite upper end 326 is a lower end 330 mounted on the distributor plate 322 and/or bearing a basket 325. The tank 310 may include a blow-molded plastic liner 332 reinforced by a layer 334 of fiberglass wrap or the like as described above. The bottom 318 of the tank 310 is supported on a stand 340 having a central boss 342 and molded supporting ribs 344.

The tank 310 differs from the tank 10 of the first embodiment in that the dome hole and dome plug of the first embodiment are omitted entirely or, optionally, can be replaced with an access hole closed with a simple plug (not shown). The conductivity monitor 370 also differs from the conductivity monitor of the first embodiment in that signal processing elements are provided internally of the tank 310 rather than externally, and signals are transmitted wirelessly so as to omit the need for chases or openings for the passage of wires or cables through the tank wall. The wireless communication may be, for example, by radio frequency, which requires no internal power source.

Referring to FIGS. 9 and 10, the probes 372, 374, and 376 are mounted on a printed circuit board ("PCB") 400 encapsulated in a waterproof resin casing 402. As with the probes of the first embodiment, each probe 372, 374, and 376 is formed from a pair of vertically aligned, horizontally spaced electrodes 378. The casing 402 is mounted on the riser tube 324 by clamps (not shown) or other connectors (not shown) so that the probes 372, 374, and 376 are positioned at the same locations as the probes 72, 74, and 76 of the first embodiment. The PCB 400 includes electronics for performing at least some of the signal conditioning and processing functions that were performed externally of the tank in the first embodiment. These functions may include, for example, current to voltage conversion, A/D conversion, and filtering. Performing these functions internally of the tank 310 enables communications between the PCB 400 and the controller (FIG. 5) to be transmitted wireless by a radio frequency transceiver assembly rather than requiring wires. If the probes 372, 374, 376 are provided on "smart sensors"

having built in processing capability, it may be possible to dispense with an internal PCB and to simply transmit the probe output directly to the external radio frequency transceiver assembly and to have the external transceiver assembly relay those signal to the controller.

Referring to FIGS. 9 and 11, the RF transceiver assembly includes an internal transceiver 410 and external transceiver 412. Internal transceiver 410 mounted within the tank 310 in electrical communication with the PCB 400. It could be passive, in which case it is powered by radio signals from the external transceiver 412. Alternatively, it could be active and powered by a battery or a capacitor imbedded in a housing for the transceiver 410. In the illustrated embodiment, internal transceiver 410 is mounted on the bottom of the distributor 325 directly above the inner surface of the bottom 318 of the tank 310. The internal transceiver 410 contains a radio frequency board that is connected to the PCB 400 by wires (not shown). Alternately, the PCB 400 could be eliminated, and it's electronics could be incorporated into the radio frequency board of transceiver 410.

Still referring to FIGS. 9 and 11, the external transceiver, 412 is mounted externally of the tank 310 in proximity to the internal transceiver 410. A spacing of up to 1.5", but more typically of 0.5" or less between the transceiver boards, being typical. In the illustrated embodiment, external transceiver 412 is provided on an annular board mounted in an annular housing 416 just beneath the bottom of the liner 332. As it typically with such systems, the external transceiver 412 communicates with the internal transceiver 410 via radio frequency (RF) signals. It also communicates with the controller 54 (FIG. 5) via either a wired or wireless connection. Wireless communication could, for example, occur via WIFI or BLUETOOTH.

In the resulting system, the AC drive signal and possibly other signals are generated on board 400 in response to transmitted signals to the external transceiver 412 from the controller and relayed to the internal transceiver 410 as an RF signal. Data from the probes 372, 374, 376 is delivered via an RF signal to the external transceiver 412 from the internal transceiver 410 and then relayed to the controller for the calculations discussed above in connection with FIGS. 4-7. In order to reduce power draw, monitoring need not be performed continuously but, instead, be performed on an intermittent basis such as once per minute when water is flowing.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. A water treatment system:
   a water treatment tank that is configured to be placed in communication with a water source and to store ion exchange media forming a resin bed, the water treatment tank including a peripheral wall, a bottom end, and a top end;
   a conductivity monitor comprising first and second vertically-spaced probes located in a portion of the water treatment tank that is configured to contain the resin bed;
   a flow meter that is configured to measure volumetric water flow through the water treatment tank;
   a control valve assembly that is configured to control fluid flow into and out of the water treatment tank;
   a controller in operative communication with the conductivity monitor, the flow meter, and the control valve assembly, the controller being configured, during a service phase of a water treatment cycle that follows a regeneration phase of the water treatment cycle, and using signals from the flow meter and the conductivity monitor, to
   detect depletion of the ion exchange media at the first probe and, upon such detection at the first probe, determine an actual volume of water ($AV_{P1}$) that has flowed through the water treatment tank thus far during the service phase of the water treatment cycle, and estimate an actual total volumetric capacity ATVC of the ion exchange media in the resin bed,
   detect depletion of the ion exchange media at the second probe and, upon such detection at the second probe, determine an actual volume of water ($AV_{P1-P2}$) flowing through the water treatment tank between depletion detection at the first and second probes, and
   calculate an updated actual total volumetric capacity UATVC based on the determined values of ($AV_{P1-P2}$) and $AV_{P1}$.

2. The water treatment system of claim 1, wherein the first probe is located proximate a nominal midpoint of the resin bed and the second probe is located half-way between the first probe and a nominal bottom of the resin bed, and wherein the controller is configured, during the service phase of a water treatment cycle to
   estimate a total volumetric capacity ETVC of the ion exchange media in the water treatment tank at the beginning of the service phase of the water treatment cycle.

3. The water treatment system of claim 2, wherein the controller is configured to determine UATVC using the equation: $UATVC=2(AV_{P1-P2})+AV_{P1}$.

4. The water treatment system of claim 2, wherein the controller is further configured, upon detection of depletion of the ion exchange media at the first probe, to determine that one half of the estimated total volumetric capacity of the ion exchange media remains, leaving an estimated remaining capacity $ERVCP1=½ ETVC$.

5. The water treatment system of claim 3, wherein the conductivity monitor further comprises a third probe that is positioned beneath the second probe near a bottom surface of the resin bed, and wherein the controller is configured to detect depletion of the ion exchange media at the third probe and, upon such detection at the third probe, determine actual or imminent exhaustion of the of the resin bed.

6. The water treatment system of claim 1, wherein the controller is configured to detect depletion at each probe by comparing conductivity-based measurement between that probe and another probe.

7. The water treatment system of claim 1, wherein the controller is further configured to normalize data from the second probe to data from the first probe prior to determining the actual total volumetric capacity ATVC in the water treatment tank.

8. The water treatment system of claim 1, wherein the controller is configured to normalize data by, obtaining raw data readings from each of the first and second probes at the same time, determining a scaling factor required to make the data reading from the second probe equal the data reading from the first probe, and for subsequent data readings, multiplying the data reading from the second probe by the scaling factor.

9. A water treatment system:
a water treatment tank that is configured to be placed in communication with a water source and to store ion exchange media forming a resin bed, the water treatment tank including a peripheral wall, a bottom end, and a top end;
a conductivity monitor comprising first and second vertically-spaced probes located in a portion of the water treatment tank that is configured to contain the resin bed;
a flow meter that is configured to measure volumetric water flow through the water treatment tank;
a control valve assembly that is configured to control fluid flow into and out of the water treatment tank;
a controller in operative communication with the conductivity monitor, the flow meter, and the control valve assembly, the controller being configured, using signals from the flow meter and the conductivity monitor, to determine an actual total volumetric capacity of the water treatment tank, wherein the controller is further configured to
transmit excitation signals through the first and second probes to produce output signals at each probe that are dependent upon the prevailing conducity of the ion exchange media at the respective probe, each of the output signals being of finite duration, having a beginning and an end, and
periodically sample the output signals from each of the probes, wherein at least some of the samples are obtained with a delay of no more than 10 milliseconds from the beginning of the corresponding output signal.

10. The water treatment system of claim 9, wherein the delay is no more than 5 milliseconds.

11. The water treatment system of claim 1, wherein the water treatment tank further comprises
a riser tube that is configured to extend vertically through the resin bed, and wherein
the first and second probes are supported on the riser tube.

12. The water treatment system of claim 11, further comprising wires that extend from the probes through a sealed opening formed in an upper dome of the water treatment tank.

13. The water treatment system of claim 1, wherein the controller is further configured to, after determining the updated actual total volumetric capacity UATVC of the ion exchange media, determine a remaining volumetric capacity of the ion exchange media.

14. The water treatment system of claim 13, wherein the controller is further configured to, after determining a remaining volumetric capacity of the resaid bed, implementing control of one or more aspects of a regeneration cycle of the system.

15. The water treatment system of claim 9, wherein, when graphed in voltage amplitude versus time, a curve of each output signal is generally saw-toothed in shape, having a leading edge, a trailing edge, and a peak located between the leading edge and the trailing edge, and wherein the sample is obtained at a time corresponding to a location between the leading edge of the curve and the peak of the curve.

16. A water treatment system:
a water treatment tank that is configured to be placed in communication with a water source and to store ion exchange media forming a resin bed, the water treatment tank including a peripheral wall, a bottom end, and a top end;
a conductivity monitor comprising first and second vertically-spaced probes located in a portion of the water treatment tank that is configured to contain the resin bed;
a flow meter that is configured to measure volumetric water flow through the water treatment tank;
a control valve assembly that is configured to control fluid flow into and out of the water treatment tank;
a controller in operative communication with the conductivity monitor, the flow meter, and the control valve assembly, the controller being configured, using signals from the flow meter and the conductivity monitor, to determine a volumetric capacity of the water treatment tank, wherein the controller is further is configured to
periodically transmit excitation signals through the first and second probes to produce output signals at each probe that are dependent upon the prevailing conductivity of the ion exchange media at the respective probe, each of the output signals having a temporal period, and
sample the output signals from each of the probes, wherein at least some of the samples are obtained with a delay of no more than 20% into the period of the corresponding output signal.

17. The control system of claim 16, wherein the delay is no more than 10% into the period of the corresponding output signal.

* * * * *